US007155187B2

(12) United States Patent
Urita

(10) Patent No.: US 7,155,187 B2
(45) Date of Patent: Dec. 26, 2006

(54) DIGITAL CORDLESS TELEPHONE

(75) Inventor: Hideyuki Urita, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 274 days.

(21) Appl. No.: 10/726,691

(22) Filed: Dec. 4, 2003

(65) Prior Publication Data

US 2004/0142664 A1    Jul. 22, 2004

(30) Foreign Application Priority Data

Dec. 4, 2002    (JP) .............................. 2002-352463

(51) Int. Cl.
*H04M 3/42* (2006.01)
*H04M 1/00* (2006.01)
*H04B 1/16* (2006.01)

(52) U.S. Cl. .............................. 455/235.1; 455/552.1; 455/414.1

(58) Field of Classification Search ............... 455/74.1, 455/414.1, 461, 560, 435.1, 426, 553.1, 417, 455/460, 574, 343, 552, 434, 462, 465.1, 455/421, 517–520, 507–509, 528, 521, 235.1, 455/550.1, 552.1, 458, 554, 450, 452, 456.6, 455/457; 379/211.02; 370/340, 341, 329, 370/327, 349, 312, 328

See application file for complete search history.

(56) References Cited

U.S. PATENT DOCUMENTS 6,405,063 B1 * 6/2002 Hashimoto .................. 455/574
6,741,835 B1 * 5/2004 Pulver ........................ 455/3.05
6,996,414 B1 * 2/2006 Vishwanathan et al. .... 455/518
2004/0033809 A1 * 2/2004 Smith et al. ................. 455/461
2005/0013421 A1 * 1/2005 Chavez et al. ........... 379/93.09
2005/0021713 A1 * 1/2005 Dugan et al. ............... 709/223

FOREIGN PATENT DOCUMENTS

| JP | 10-155177 | 6/1998 |
|---|---|---|
| JP | 10-200955 | 7/1998 |
| JP | 11-88952 | 3/1999 |
| JP | 11-88960 | 3/1999 |
| JP | 2001-285934 | 10/2001 |
| JP | 2001-339768 | 12/2001 |

* cited by examiner

Primary Examiner—Melody Mehrpour
(74) Attorney, Agent, or Firm—Wenderoth, Lind & Ponack, L.L.P.

(57) ABSTRACT

The present invention improves an inconvenience of the conventional system in that cordless hand sets must be registered in advance, and reduces the power consumption in the waiting state. The digital codeless telephone according to the invention uses a public telephone network. In the system of the invention, a transmitting party calls a receiving party by means of a message having a group identification code for direct communication between personal stations and information for a waiting mode change request. The system makes the receiving party prepare for receiving, by an event that the receiving party changes the waiting mode according to the message.

20 Claims, 3 Drawing Sheets

DIGITAL CORDLESS TELEPHONE

FIELD OF THE INVENTION

The present invention relates to a digital cordless telephone. More specifically, the present invention relates to a digital cordless telephone which is provided with a transceiver mode that allows a direct communication between cordless hand sets of the PHS (Personal Handy System).

DESCRIPTION OF THE RELATED ART

The PHS is stipulated to communicate in conformity with the RCR STD-28, which is the standard (ARIB Standard) of the second-generation cordless telephone system determined by the Association of Radio Industries and Business of Japan. Clause 2.10 of the standard states, regarding the 'direct communication between cordless hand sets', the effect of the provision of the function that "a mobile station of this system shall be capable of a direct and mutual communication between mobile stations without intervention of a base station (direct communication between cordless hand sets) as an auxiliary communication means in an area where the communications with intervention of the base station are impossible, and so forth".

The direct communication between cordless hand sets in the above standard will approve a use as a transceiver between PHS cordless hand sets that are registered in advance with the parent equipment within the permissible scope of the Wireless Telegraphy Act (the exceptive clause of the fourth article, the Wireless Telegraphy Act). However, it is very rare that a PHS owner practices of a PHS handset use as the transceiver. The reason is that there are notable inconveniences, such that the cordless hand sets have to be registered in advance with the parent equipment, or with fellow cordless hand sets. In addition, power consumption in the waiting state by the transceiver is comparably high; there is also a demand that the equipment is desirably put in the waiting state only when it is used in the transceiver mode.

A conventional example to solve the above problem is disclosed in JP-A No. 339768/2001, which involves a disadvantage in that, since the system deals with unspecified speakers, the system will reveal an inter-cordless hand set group calling code and extension number to the other party with whom the group members do not want to communicate. Also, the example still has the problem of power consumption in the waiting state. The Publication JP-A no. 285934/2001 premises that the cordless hand sets are registered with the parent equipment in advance; therefore, the above problem regarding the registration of the cordless hand sets is not basically solved. In this regard, the JP-A No. 11-88960, JP-A No. 11-88952, and JP-A No. 10-155177 are the same.

The Publication JP-A No. 10-200955 discloses the invention in claim 1 thereof, "a mobile telephone with an automatic communication switching function that receives the service from a communication enterprise, which is specialized by providing a function that transmits a control signal from a transmitting-side telephone, and sets the same frequency as that of the transmitting-side telephone to a receiving-side telephone, and an automatic communication switching function capable of detecting the response of the receiving-side telephone to a test radio wave from the transmitting-side telephone, and capable of switching the communication into the transceiver communication in a communication between mobile telephones". Although this invention includes an inconvenience such as 'registering the cordless hand sets with the parent equipment' and so forth, this is the same as the present invention described hereunder, in view of the system that switches into the transceiver communication by using a public telephone line. However, the system is to properly use 'two different tone signals' and switch into the transceiver communication. Since the system uses the tone signals during a communication, the system involves an inconvenience such that the communication has to be disconnected temporarily and a second communication has to be established. The other data communications in the PHS also involve similar inconveniences.

In this manner, when a transceiver communication is performed between cordless hand sets of the PHS, it involves the inconvenience that the cordless hand sets must be registered in advance, and the requirement to achieve the reduction of power consumption in the waiting state. Also, in the system that switches into the transceiver communication by using a public telephone line, an easy and simplified system in conformity with the sequence of the PHS is demanded. Further, the system bears a social demand not to leak secret information of the communication to unspecified speakers.

SUMMARY OF THE INVENTION

In order to solve the above problems, the present invention adopts a system that sets the group identification code for direct communication between personal stations and an extension number in the public communication system conforming to the ARIB standard, in a normal communication between specified speakers. The system employs a called party subaddress information element and so forth in the call setting messages, for transferring information such as the group identification code for direct communication between personal stations, and so forth. The present invention adopts a system that conforms to the sequence of the PHS, and switches the waiting mode according to the contents of only the 'control signal' (CC control signal in the present invention). Therefore, the system of the present invention does not involve the inconveniences that are inherent to the conventional systems in that the communication has to be disconnected temporarily and a second communication has to be established, in order to carry out the normal (original) communication in the conventional systems.

DETAILED DESCRIPTION OF THE PREFERRED EMBODIMENTS

The embodiment of the present invention will now be described in detail. The embodiment of the present invention adopts a system that sets the group identification code for direct communication between personal stations and an extension number in the public communication system conforming to the above standard, in a normal communication between specified speakers. That is, the system of this embodiment transmits necessary information to the other party by means of a public telephone network, and lets the other party prepare for receiving.

Figure 1:
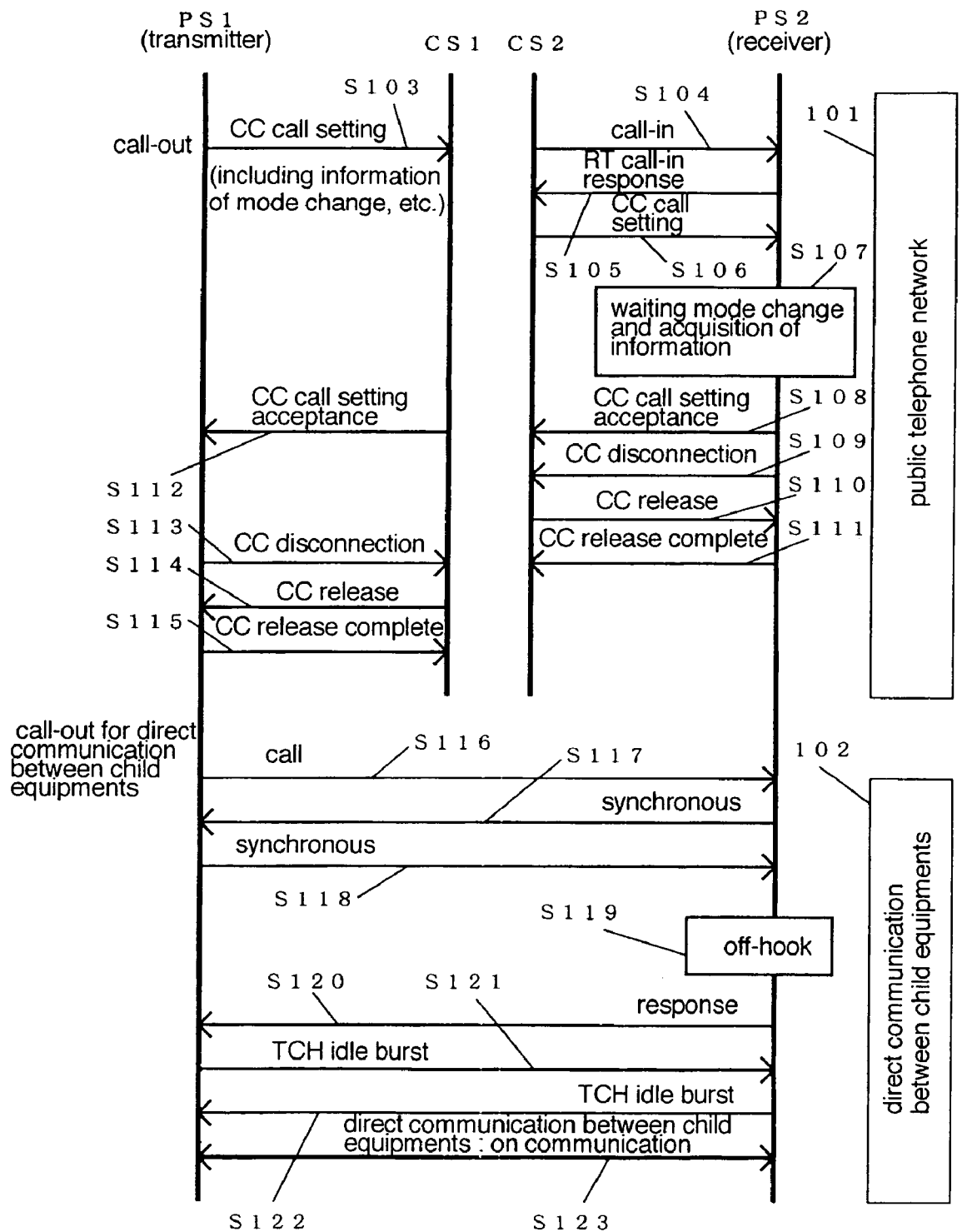
FIG. 1 is a sequence chart until a direct communication is started between cordless hand sets in the embodiment according to the present invention.

FIG. 1 illustrates a sequence until a direct communication between cordless hand sets is started, in this embodiment. In FIG. 1, the left side shows a transmitter PS1 (Personal Station 1), which is linked with a cell station CS1, and the right side shows a receiver PS2 (Personal Station 2), which is linked with a cell station CS2. When the transmitter PS1 calls the receiver PS2 through a public telephone network 101, in order to make a conversation with the receiver PS2 in the transceiver mode, the sequence first executes a CC (Call Control) call setting S103, which is unique to the present invention, to the cell station CS1 that is linked with the transmitter PS1. The CC setup S103 signifies the called party subaddress information, etc., which is unique to the present invention as described hereinafter, which includes information for requesting to change the waiting mode, and so forth.

The calling by the transmitter PS1 calls the receiver PS2, as a calling S104 from the cell station CS2 to the receiver PS2. As the receiver PS2 responds to this paging (call-in) S104, the information is answered to the cell station CS2 as a RT paging response S105. Here, RT is an abbreviation for Radio Frequency Transmission Management, which signifies the processes of the setting, maintaining, switching, disconnecting and recovering of the network connection in the wireless interval interface of the second-generation cordless telephone system, and the location registration and authentication of the personal stations. Receiving the response from the receiver PS2, the cell station CS2 transmits to the receiver PS2 a CC setup (call setting) S106 corresponding to the CC setup S103 of the transmitter PS1.

Receiving the CC setup S106, the receiver PS2 normally stores in the internal memory of its own PHS the information that the transmitter PS1 transmitted, such as the waiting mode change and so forth. This information includes the transmitter telephone number, an identifier for requesting to change the waiting mode, a designated waiting mode, a group identification code for direct communication between personal stations, a PS station number, and so forth. The information of the other party is displayed on the display unit as needed.

Further, the conventional example designates the extension number that is used in the transceiver mode by utilizing the password contained in the transfer message. However, the present embodiment directly designates the extension number as the PS station number (hereunder, referred to as the extension number).

Figure 2:
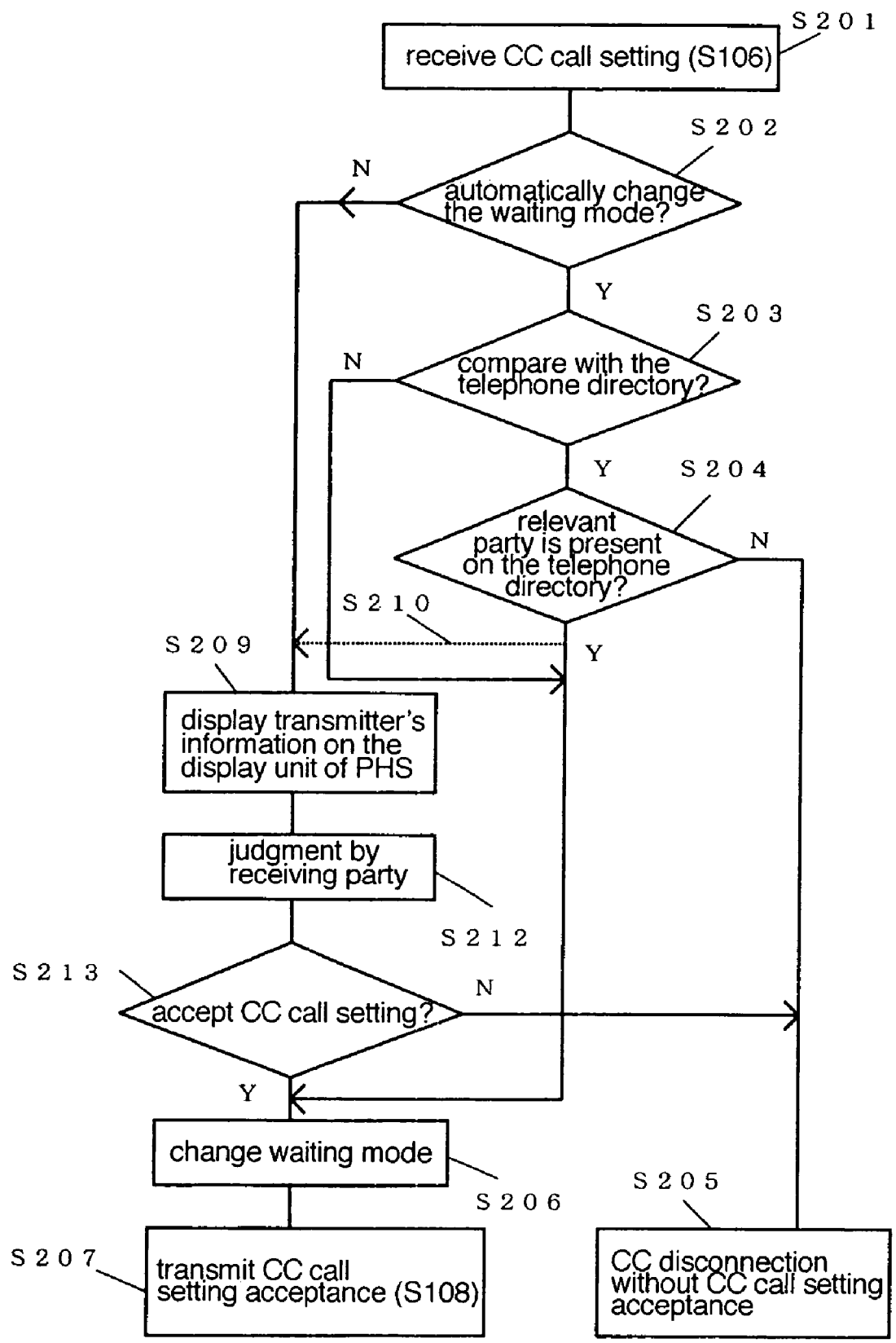
FIG. 2 is a flow chart until a receiving party determines to change the waiting mode, in the embodiment according to the present invention.

Whether or not to accept the transmitter's request to change the waiting mode and so forth is determined in principle by the receiver on the basis of the display (S107 in FIG. 1). FIG. 2 illustrates a flow chart of a process until the receiver determines to change the waiting mode. In FIG. 2, when the CC setup (S106) in FIG. 1 is received (S201), this embodiment is made capable of determining whether to automatically change the waiting mode (S202). If the step automatically changes the waiting mode (Y at S202), it is next selected whether or not to compare with the telephone directory (S203). Here, the telephone directory signifies a certain data stored in the internal memory, etc., of the PHS, and a telephone book is one example thereof.

The objects of comparison are the information to thereby identify the relevant transmitter, such as the names and telephone numbers of acquaintances on the list of the telephone directory, and other electronic mail addresses, etc. If the relevant party is not present on (in) the telephone directory (N at S204), since the waiting mode change is automatically selected already, the CC disconnection is made without CC call proceeding (acceptance) (S205). In terms of the transceiver, this means disconnecting the line automatically in response to the calling from the other party. Executing this disconnection (S205) before ringing a receiving melody and the like will make it possible to prevent harassments, etc.

If the comparison with the telephone directory is not executed (N at S203), and if the relevant party is present on the telephone directory (Y at S204), the waiting mode is automatically changed (S206). Thereafter, to inform the transmitter of accepting the CC setup, a CC call proceeding is transmitted (S207).

In this embodiment, only when the waiting mode is not automatically changed (N at S202), the information of the transmitter's number and the like are to be displayed on the display unit of the PHS (S209); however, the display may be made independently. If the setting of the automatic mode change is selected, and if the relevant transmitter is present on the telephone directory, the information is also given on the display unit (S210).

If the waiting mode is not automatically changed (N at S202), the judgment by the receiver is thereafter executed (S212). This judgment will be made with reference to the above information that is displayed on the display unit. As a result, if the waiting mode is changed (Y at S213), the waiting mode is changed in practice (S206), and then the CC call proceeding is transmitted (S207). Further, if the waiting mode is not changed (N at S213), the CC disconnection is made without CC call proceeding (S205).

Returning to FIG. 1, the sequence of the direct communication between the cordless hand sets will be disclosed, when the change of the waiting mode and so forth are executed (S107). In FIG. 1, the receiver transmits the CC call proceeding (S108) for notifying the transmitter that the changes of the waiting mode and so forth have been executed. Thereafter, the receiving side terminates the communication with the cell station CS2 so as to execute the change into the waiting mode that the transmitter desired. This termination is executed by the notification of the CC release (S110) from the cell station CS2, which responds to the CC disconnect (S109) from the receiver PS2, and the notification of completion of the CC release (S111) from the receiver PS2, which responds to the former notification.

The CC call proceeding (S108) from the receiver PS2 is transmitted to the transmitter PS1 through the cell station CS1. Receiving this information, the transmitter PS1 normally changes its own mode into the same waiting mode as the transmitter requested the receiver. Thereafter, the transmitter PS1 terminates the communication with the cell station CS1. This termination is executed by the notification of the CC release (S114) from the cell station CS1, which responds to the CC disconnect (S113) from the transmitter PS1, and the notification of the CC release completion (S115) from the transmitter PS1, which responds to the former notification.

According to the standard norm, the inter-cordless hand set group calling code is notified to the other party as the transfer message. However, the embodiment of the invention adopts the system that employs the called party subaddress information element and so forth, as will be described later, in the CC setup (S103), as to the information that is required for the transition to the transceiver mode, such as the inter-cordless hand set group calling code, and so forth. Therefore, this embodiment does not use the transfer message for transferring the inter-cordless hand set group calling code and so forth.

Thus, according to the above sequence, the cordless hand sets of both the transmitter PS1 and the receiver PS2 were transferred to the transceiver mode on a public telephone network. Thereafter, the direct communication between the cordless hand sets (102) is made by means of the message for the direct communication between the cordless hand sets. The call-out in the transceiver mode may be made from either side of the transmitter PS1 and the receiver PS2; however, this embodiment discloses the system to make the call-out from the transmitter PS1. When the transmitter PS1 calls the receiver PS2, the inter-cordless hand set group calling code and the extension number of the receiver PS2 are designated, and the call message is directly transmitted without intervention of the cell stations as the message for the direct communication between the child equipments, on the basis of the CC call proceeding (S112), and thus, the direct communication between the cordless hand sets is carried out (S116). The receiver PS2 compares the group identification code for direct communication between personal stations and the extension number that are contained in the call message with the data contained in its own internal memory. If the result conforms, the receiver PS2 transmits a synchronization message as the message for the direct communication between the personal stations (S117). In the same manner, the transmitter PS1 transmits the synchronous message as the message for the direct communication between the child equipments (S118), whereby both the transmissions are established.

Upon reaching this stage, as the receiver PS2 who received the call unhooks the PHS to make the conversation (S119), the receiver PS2 transmits a connect message (S120) as the message for the direct communication between the personal stations, in order to notify the transmitter PS1 that transmission has started.

Receiving the connect message, the transmitter PS1 transmits a TCH (Transfer Channel) idle burst to the receiver PS2, and waits for the receiver PS2 to reach the TCH starting state (steady state) (S121). Also, the receiver PS2 transmits the TCH idle burst to the transmitter PS1, and waits for the transmitter PS1 to reach the TCH starting state (steady state) (S122). At this stage, both reach the TCH starting state in the end, which allows the communication by the transceiver mode (S123).

The conventional example transmits the transfer message for transferring the group identification code for direct communication between personal stations before the alerting message, and automatically executes the setting of the receiving-side cordless hand set, by such a contrivance that utilizes the password (the password itself is to conceal the group identification code for direct communication between personal stations) contained in the transfer message as the extension number. In contrast to this, the embodiment of the present invention adopts the system that automatically executes the change of the waiting mode of the receiving-side cordless hand set and so forth during a normal communication through a public telephone network, and the information of the system is not the transfer message that is normally used, but the called party subaddress information element, etc., contained in the CC call setup (S103 in FIG. 1) in the public communication.

Figure 3:
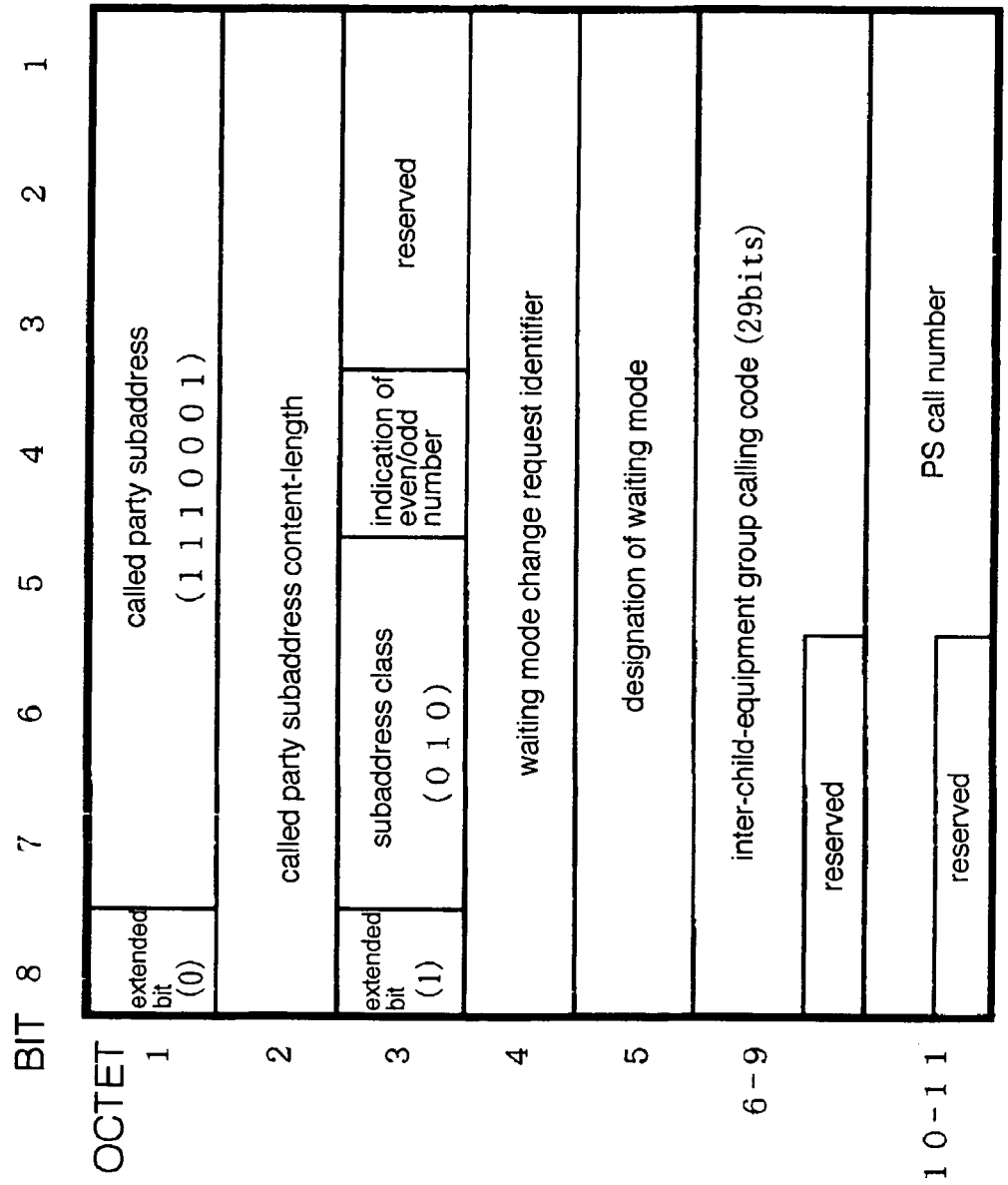
FIG. 3 is a chart illustrating the configuration of the called party subaddress information element, based on the embodiment of the present invention.

FIG. 3 illustrates the configuration of the called party subaddress information element according to the embodiment. The called party subaddress is used for identifying the subaddress on the receiving side. Here, the subaddress signifies the numbers that are added on after the telephone number to make a call directly get to an extension of a private telephone switchboard (PBX) and so forth. The called party subaddress information element in itself is optional, and has a high degree of freedom in format, but it is restricted to 23 octets maximum. In FIG. 3, the first octet is composed of an extended bit of the $8^{th}$ bit, and an information element identifier (7 bits) not more than the $8^{th}$ bit. In this case, the information element identifier is the called party subaddress (1110001). The second octet is an information element content length, and is the called party subaddress content length in this case. The third octet is composed of an extended bit of the $8^{th}$ bit, a subaddress type from the $7^{th}$ through the $5^{th}$ bit, a display as to whether the number of the $4^{th}$ bit address signal is even or odd, and a reserved area from the $3^{rd}$ through the $1^{st}$ bit. Here, a user unique subaddress (101) is adopted as the subaddress type. This is because the subaddress information more than on the fourth octet is composed with a unique configuration in the embodiment of this invention.

The fourth octet is a waiting mode change request identifier that is a unique configuration in the embodiment of this invention. This information element identifier indicates that this message shows the content of the transmitter PS1 demanding the waiting mode change to the receiver PS2. The fifth octet is an area for designating the waiting mode, and the content is shown in the following table.

| Bit | mode |
| --- | --- |
| 00000000 | only for registration (mode change unavailable) |
| 00000001 | public |
| 00000010 | private |
| 00000011 | transceiver (direct communication between cordless hand sets) |
| 00000100 | public + private |
| 00000101 | public + transceiver |
| 00000110 | private + transceiver |
| 00000111 | public + private + transceiver |

Here, 'public' signifies a communication using a public cell station, 'private' signifies a communication using a parent equipment of a home digital cordless system, or a cell station of a company or business cordless system, and 'transceiver' signifies a communication by the direct communication between cordless hand sets by the PHS. The waiting mode designation '00000000' is for registering the group identification code for direct communication between personal stations and so forth, but not executing the waiting mode change. This is effective in the case of completing only the setting before using the transceiver mode in practice.

The sixth through ninth octets are allocated for the group identification code for direct communication between personal stations composed of 29 bits. The group identification code for direct communication between personal stations should originally be transmitted to the other party as a transfer message with the password attached, as the standard norm or in the conventional examples. However, the embodiment of this invention adopts the configuration that is transmitted to the other party as the subaddress information of the called party subaddress information element. The tenth through eleventh octets are allocated for the PS station number, which is used as the extension number. This embodiment employs the public telephone network (101), and is able to fix this PS station number comparably freely, which is advantageous.

The embodiment of this invention has disclosed the system using the called party subaddress information element. However, the information element identifiers contain a calling party subaddress having a format which is similar to the called party subaddress. Accordingly, using the calling party subaddress will make up the same configuration as the called party subaddress according to the embodiment of this invention.

According to the embodiment of the invention as described above, the system is adopted which utilizes a public telephone network to send necessary information to the other party, and lets the other party prepare for receiving. Therefore, if the mode is set to be changeable in advance, it will allow using the transceiver easily with the PHS of a specified person. Since the system uses a public telephone network, the interventions of unspecified persons can be prevented so as to secure the privacy of communications. In addition, the waiting by the transceiver becomes unnecessary, which reduces the power consumption during waiting. Besides, the system saves a troublesome registration operation that is regarded as necessary with the transceiver of the PHS.

The conventional 'system that switches into the transceiver communication by using a public telephone line' is the system that properly uses the 'two different tone signals' to switch into the transceiver communication. The system of the present invention conforms to the sequence of the PHS, and switches into the transceiver communication according to only the contents of the 'control signal' (CC control signal in this invention). Thus, the communication systems of both are different. Therefore, the conventional system is not able to secure the privacy of communications in the transceiver communication, and is not able to reduce the power consumption during waiting. However, the present invention is able to satisfy these requirements sufficiently. Moreover, the conventional system properly uses the 'two different tone signals' to switch into the transceiver communication, after establishing a communication, and the system uses the tone signals during the communication. Thus, the conventional system involves an inconvenience such that the communication has to be disconnected temporarily and a second communication has to be established. However, since there does not occur such inconveniences in the present invention, it is possible to shorten the time until entering a conversation on the transceiver communication.

In a remote area where a public telephone network is not available, the system according to the embodiment of this invention can be restricted. There are conceivably quite a few demands for this system in the areas where public telephone networks are available. It is also possible to change the setting in advance in the areas where public telephone networks are available. In that case, the present invention allows the transceiver to be used with ease in a remote place from the cell station, which will not conceivably impair the effectiveness of the invention.

What is claimed is:

1. A digital codeless telephone having a transceiver mode and a public telephone network mode, said digital codeless telephone comprising:
   a first codeless hand set operable to call with a message having a group identification code by using a public telephone network communication for setting a transceiver communication; and
   a second codeless hand set operable to change the public telephone network mode to the transceiver mode according to the message, wherein:
   said second codeless hand set is made to prepare for receiving a call from said first codeless hand set through the transceiver communication; and
   the group identification code included in the message from said first codeless hand set to said second codeless hand set is information which is necessary for said first codeless hand set and said second codeless hand set to communicate in the transceiver mode.

2. The digital codeless telephone as claimed in claim 1, wherein a called party subaddress or a calling party subaddress is used as the message.

3. A digital codeless telephone having a transceiver mode and a public telephone network mode, said digital codeless telephone composing:
   a first codeless hand set operable to call with a message having a group identification code using a public telephone network communication for setting a transceiver communication; and
   a second codeless hand set having a memory for storing the group identification code communicated from said first codeless hand set over the public telephone network communication so as to enable communication between said first codeless hand set and said second codeless hand set through the transceiver communication, wherein:
   public telephone network communication between said first and second codeless hand sets is registered; and
   the group identification code included in the message from said first codeless hand set to said second codeless hand set is information which is necessary for said first codeless hand set and said second codeless hand set to communicate in the transceiver mode.

4. The digital codeless telephone as claimed in claim 3, wherein a called party subaddress or a calling party subaddress is used as the message.

5. The digital codeless telephone as claimed in claim 1, wherein each of said first and second codeless hand sets has a display for showing information of the other party.

6. The digital codeless telephone as claimed in claim 3, wherein each of said first and second codeless hand sets has a display for showing information of the other party.

7. The digital codeless telephone as claimed in claim 1, wherein each of said first and second codeless hand sets has an information memory for storing information including a name, a telephone number and an electronic mail address.

8. The digital codeless telephone as claimed in claim 3, wherein each of said first and second codeless hand sets has an information memory for storing information including a name, a telephone number and an electronic mail address.

9. The digital codeless telephone as claimed in claim 1, wherein said digital codeless telephone further has a private mode for a communication between said first and second codeless hand sets through a private call station.

10. The digital codeless telephone as claimed in claim 9, wherein the private call station is a home digital cordless system.

11. The digital codeless telephone as claimed in claim 3, wherein said digital codeless telephone further has a private mode for a communication between said first and second codeless hand sets through a private call station.

12. The digital codeless telephone as claimed in claim 11, wherein the private call station is a home digital cordless system.

13. A digital codeless telephone comprising:
   a home digital codeless system having a public telephone network mode for communicating with another party through a public telephone network, and a codeless mode for communicating through a codeless communication;

a first codeless hand set having the public telephone network mode for communicating with the other party through said home digital codeless system and the public telephone network, the codeless mode for communicating with said home digital codeless system through the codeless communication, and a transceiver mode for communicating through a transceiver communication; and a second codeless hand set having the public telephone network mode for communicating with the other party through said home digital codeless system and the public telephone network, the codeless mode for communicating with said home digital codeless system through the codeless communication, and the transceiver mode for communicating with said first codeless hand set through the transceiver communication, wherein said first codeless hand set is operable to communicate with said second codeless hand set in the transceiver mode through the transceiver communication, without using said home digital codeless system, by using a group identification code.

14. The digital codeless telephone as claimed in claim 13, wherein:

said first codeless hand set is operable to call said second codeless hand set with a message having a group identification code for the public telephone network; and the message includes one of a called party subaddress and a calling party subaddress.

15. The digital codeless telephone as claimed in claim 13, wherein each of said first and second codeless hand sets has a display for showing information of the other party.

16. The digital codeless telephone as claimed in claim 13, wherein each of said first and second codeless hand sets has an information memory for storing information including a name, a telephone number and an electronic mail address.

17. The digital codeless telephone as claimed in claim 13, wherein each of said first and second codeless hand sets is operable to compare information of the other party called thereby with information stored in an information memory comprised in each of said first and second codeless hand sets.

18. The digital codeless telephone as claimed in claim 17, wherein said first and second codeless hand sets do not change the mode of communication when the compared information stored in each information memory does not match.

19. The digital codeless telephone as claimed in claim 13, wherein said digital codeless telephone further has a private mode for a communication between said first and second codeless hand sets through a private call station.

20. The digital codeless telephone as claimed in claim 19, wherein the private call station is a home digital cordless system.

* * * * *